US008290178B2

(12) United States Patent
Nakadai et al.

(10) Patent No.: US 8,290,178 B2
(45) Date of Patent: Oct. 16, 2012

(54) SOUND SOURCE CHARACTERISTIC DETERMINING DEVICE

(75) Inventors: Kazuhiro Nakadai, Saitama (JP); Hiroshi Tsujino, Saitama (JP); Hirofumi Nakajima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1072 days.

(21) Appl. No.: 12/010,553

(22) Filed: Jan. 25, 2008

(65) Prior Publication Data

US 2008/0199024 A1 Aug. 21, 2008

Related U.S. Application Data

(63) Continuation-in-part of application No. PCT/JP2006/314790, filed on Jul. 26, 2006.

(60) Provisional application No. 60/702,773, filed on Jul. 26, 2005.

(51) Int. Cl.
*H04R 3/00* (2006.01)
*G01S 3/80* (2006.01)

(52) U.S. Cl. ........................... 381/92; 367/121; 367/124

(58) Field of Classification Search .................... 381/56, 381/92; 367/121, 124, 129
See application file for complete search history.

(56) References Cited

U.S. PATENT DOCUMENTS 3,441,900 A * 4/1969 Ulstad et al. .................. 367/135
4,485,484 A * 11/1984 Flanagan ......................... 381/92
4,741,038 A * 4/1988 Elko et al. ....................... 381/92

(Continued)

FOREIGN PATENT DOCUMENTS

JP 11-41687 2/1999

(Continued)

OTHER PUBLICATIONS

Sachar, J.M.; Silverman, H.F.; , "A baseline algorithm for estimating talker orientation using acoustical data from a large-aperture microphone array," Acoustics, Speech, and Signal Processing, 2004. Proceedings. (ICASSP '04). IEEE International Conference on , vol. 4, No., pp. iv-65-iv-68 vol. 4, May 17-21, 2004.*

(Continued)

*Primary Examiner* — Vivian Chin
*Assistant Examiner* — Andrew Graham
(74) *Attorney, Agent, or Firm* — Squire Sanders (US) LLP

(57) ABSTRACT

There is provided a sound source characteristic determining device (10) capable of being applied in an environmental where the type of a sound source is unknown. The device includes a plurality of beamformers (21-1 to 21-M) used when a sound source signal generated from a sound source at an arbitrary position in a space is inputted to a plurality of microphones (14-1 to 14-N), for weighting the acoustic signal detected by each of the microphones by using a function for correcting the difference of the sound source signals generated between the microphones and outputting a totaled signal. Each of the beamformers (21-1 to 21-M) contains a function having a unit directivity characteristic corresponding to one arbitrary direction in the space and is arranged for each of the directions corresponding to an arbitrary position in the space and the unit directivity characteristic. The sound source characteristic determining device (10) further includes means (23) for estimating the position and the direction in the space corresponding to the beamformer outputting a maximum value as the position and the direction of the sound source when the microphone (14) detects a sound source signal.

10 Claims, 6 Drawing Sheets

U.S. PATENT DOCUMENTS

| | | | | |
|---|---|---|---|---|
| 5,581,620 | A * | 12/1996 | Brandstein et al. | 381/92 |
| 5,699,437 | A * | 12/1997 | Finn | 381/92 |
| 6,219,645 | B1 * | 4/2001 | Byers | 704/275 |
| 6,449,593 | B1 | 9/2002 | Valve | |
| 6,999,593 | B2 * | 2/2006 | Rui et al. | 381/92 |
| 7,231,051 | B2 * | 6/2007 | Paviot et al. | 381/92 |
| 7,251,336 | B2 * | 7/2007 | Amiri et al. | 381/92 |
| 7,415,372 | B2 * | 8/2008 | Taenzer et al. | 702/72 |
| 7,783,060 | B2 * | 8/2010 | Brooks et al. | 381/92 |
| 7,822,213 | B2 * | 10/2010 | Choi et al. | 381/92 |
| 2003/0161485 | A1 * | 8/2003 | Smith | 381/92 |
| 2005/0100176 | A1 * | 5/2005 | Chu et al. | 381/92 |

FOREIGN PATENT DOCUMENTS

| | | |
|---|---|---|
| JP | 2001-245382 | 9/2001 |
| JP | 2001-313992 | 11/2001 |
| JP | 2002-91469 | 3/2002 |
| JP | 2003-270034 | 9/2003 |
| WO | WO 2004038697 A1 * | 5/2004 |

OTHER PUBLICATIONS

Model SM89 User Guide. 1996, Shure Brothers Inc., pp. 1-3.*

Meuse et al., “Characterization of Talker Radiation Pattern Using a Microphone Array”, LEMS, Division of Engineering, Brown University, Apr. 19-22, 2004, total of 4 pages.

* cited by examiner (a)

(b)

SOUND SOURCE CHARACTERISTIC DETERMINING DEVICE

TECHNICAL FIELD

The present invention relates to a device which determines property of a sound source such as a position of the sound source and an orientation of the sound source.

BACKGROUND ART

Techniques for determining a direction and position of a sound source by means of beamforming using microphones have been studied for many years. Recently, techniques have been proposed for determining a directivity pattern and aperture size of a sound source in addition to the direction and position of the sound source (e.g., see P. C. Meuse and H. F. Silverman, "Characterization of talker radiation pattern using a microphone array, JCASSP-94, Vol. 11, pp. 257-260).

DISCLOSURE OF THE INVENTION

However, the technique proposed by Meuse et al. assumes that acoustic signal generated by a sound source is radiated from a mouth (aperture) of a predetermined size. Also, the technique assumes that radiation patterns of acoustic signal are similar to a radiation pattern of human voice. That is, the type of sound source is limited to a human. Thus, the technique of Meuse et al. can hardly be applied to actual environments where types of sound source may not be known.

An object of the present invention is to provide a technique for accurately determining characteristics of a sound source.

The present invention provides a sound source characteristic determining device comprising a plurality of beamformers. A sound source signal produced by a sound source at a given position in space is received by a plurality of microphones. Each one of the beamformers weights output acoustic signals of the plurality microphones using a filter function and outputs a sum of the weighted acoustic signals. The filter function has a cardioid-directivity function corresponding to one orientation in the space. Each of the beamformers is provided for each position in the space as represented by a position index and for each orientation corresponding to a cardioid-directivity pattern. The sound source characteristic determining device further comprises means which, when the microphones detect the sound source signal, determines the position and orientation of the sound source in the space by determining the beamformer that has produced a maximum out value out of the plurality of beamformers.

The present invention makes it possible to accurately estimate the position of a human or other sound source which has directivity. Also, as the cardioid-directivity patterns are used to determine the direction of a sound source, an acoustic signal of any sound source may be accurately estimated.

According to an embodiment of the present invention, the sound source characteristic determining device, a set of outputs of a plurality of beamformers having different cardioid-directivity pattern at the estimated position of the sound source is obtained, which represents directivity pattern of the sound source. Thus, the directivity pattern of any sound source may be determined.

According to an embodiment of the present invention, the sound source characteristic determining device further comprises means that compares the estimated or determined directivity pattern with a database containing data of a plurality of directivity patterns corresponding to various types of sound sources. From the database, the type of sound source whose directivity pattern is most similar to the estimated directivity pattern is determined to be the type of the sound source. Thus, the types of the sound sources may be distinguished.

According to an embodiment of the present invention, the sound source characteristic determining device further comprises sound source tracking means, which compares the estimated position, orientation and type of the sound source with the position, orientation and type of the sound source estimated one time step earlier. The data are grouped as belonging to the same sound source if deviations in the position and orientation are within a predetermined range and if the types of the sound sources are determined to be the same. Since the type of sound source is taken into consideration, even if there are multiple sound sources in the space, the sound sources may be tracked.

According to an embodiment of the present invention, the sound source characteristic determining device produces a total value of outputs of the plurality of beamformers of different cardioid-directivity patterns at the estimated position of the sound source. The total value represents a sound source signal. This makes it possible to accurately extract a sound source signal of any given sound source, especially a sound source which has directivity.

The sound source characteristic determining device of the invention comprises a plurality of beamformers, each of which, when sound from a sound source at a given position in space is captured by a plurality of microphones, weights acoustic signals detected by the respective microphones using a filter function and outputs a sum of the weighted acoustic signals. Each of the beamformers has a filter function having cardioid-directivity pattern corresponding to one orientation in space. The beamformer is provided for each position and each orientation, which corresponds to a cardioid-directivity pattern. When the microphones detect the sound, the sound source characteristic determining device determines the outputs of the plurality of beamformers, determines a total value of a plurality of beamformers of different cardioid-directivity patterns at each position. The position that gives a highest total value is selected as the position of the sound source. The device also determines the orientation of the sound source based on the cardioid-directivity pattern of the beamformer that produces a highest output value at the selected position. Thus, the position and orientation of the sound source are determined.

According to an embodiment of the present invention, the sound source characteristic determining device comprises an extracting unit for extracting a plurality of sound source signals when sound generated from a plurality of sound sources at any given positions in the space is captured by a plurality of microphones. When the microphones detect sound, the device determines output of a plurality of beamformers. The beamformer position that gives a highest output value gives the position and orientation of the sound source. The position and orientation thus selected are regarded as the position and orientation of a first sound source. Then, a set of outputs from the plurality of beamformers of different cardioid-directivity patterns at the selected position of the first sound source are obtained is extracted as the sound source signal of the first sound source.

Then, the sound source signal of the first sound source is subtracted from the acoustic signal captured by the microphones. With the residue signal thus produced, outputs of a plurality of beamformers are determined. The beamformer that produces a highest value gives the position and orientation of a second sound source. A set of outputs from the beamformers of different cardioid-directivity patters at the selected position of the second sound source is extracted as the sound source signal of the second sound source.

DESCRIPTION OF SYMBOLS

Figure 1:
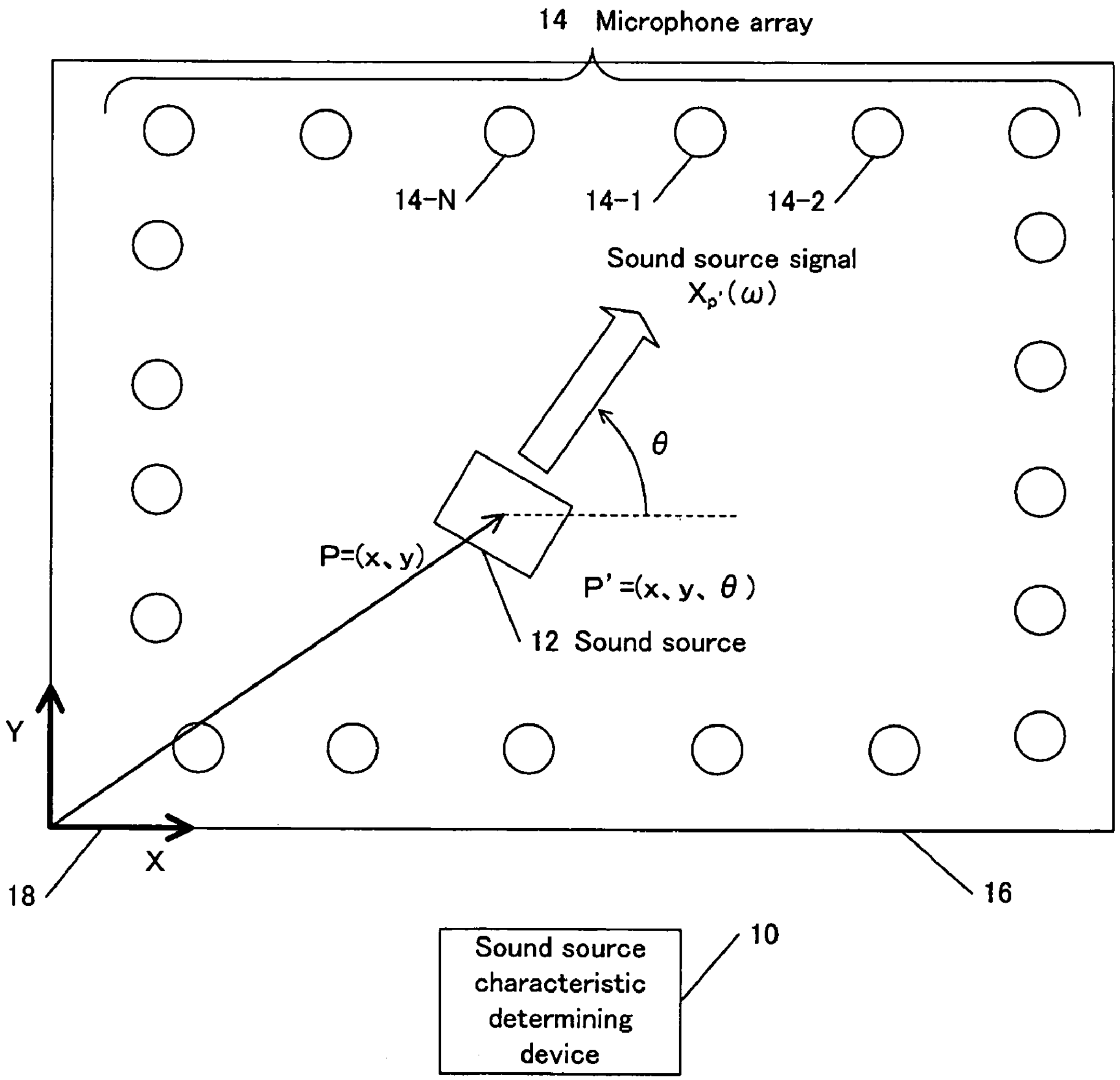
FIG. 1 is a schematic diagram showing a system which includes a sound source characteristic determining device.

10 Sound source characteristic determining device
12 Sound source
14 Microphone array
21 Multi-beamformer
23 Sound source position estimation unit
25 Sound source signal extraction unit
27 Sound source directivity pattern estimation unit
29 Sound source type estimation unit
33 Sound source tracking unit

MODE FOR CARRYING OUT THE INVENTION

Next, an embodiment of the present invention will be described below with reference to the drawings. FIG. 1 is a schematic diagram showing a system which includes a sound source characteristic determining device 10 according to an embodiment of the present invention.

Basic components of the system are a sound source 12 which, being located at any given position P(x,y) in work space 16, gives off an acoustic signal in any given direction; a microphone array 14 which includes a plurality of microphones 14-1 to 14-N which, being located at any given positions in the work space 16, detect the acoustic signal; and the sound source characteristic determining device 10 which estimates a position and direction of the sound source 12 based on detection results produced by the microphone array 14.

The sound source 12 produces voices as a means of communication, as does a human being or a robot's loudspeaker. The acoustic signal given off by the sound source 12 (hereinafter, such an acoustic signal will be referred to as a "sound source signal") has directivity, which is the property that sound wave power of a signal reaches its maximum in a transmission direction θ of the signal and varies depending on directions.

The microphone array 14 includes the n microphones 14-1 to 14-N. Each of the microphones 14-1 to 14-N is installed at any given position in the work space 16 (but coordinates of their installation positions are known). If, for example, the work space 16 is located in a room, the installation positions of the microphones 14-1 to 14-N can be selected as required from among wall surfaces, objects in the room, a ceiling, a floor surface, and the like. To estimate a directivity pattern, it is desirable to install the microphones 14-1 to 14-N in such a way as to surround the sound source 12 instead of concentrating on any one direction from the sound source 12.

The sound source characteristic determining device 10 is connected with each of the microphones 14-1 to 14-N in the microphone array 14 by wire or by radio (wire connections are omitted in FIG. 1). The sound source characteristic determining device 10 estimates various characteristics of the sound source 12 detected by the microphone array 14, including a position P and direction θ of the sound source 12.

As shown in FIG. 1, according to this embodiment, a two-dimensional coordinate system 18 is established in the work space 16. Based on the two-dimensional coordinate system 18, the position P of the sound source 12 is represented by a position vector P(x,y) and the direction of the sound source signal from the sound source is represented by an angle θ from the x-axis direction. A vector which includes the position P and direction θ of the sound source 12 is given by P'=(x,y, θ). A spectrum of the sound source signal from the sound source located at a position defined by any given position vector P' in the work space 16 is represented by $X_{P'}(\omega)$.

To estimate the position of the sound source 12 three-dimensionally, any given three-dimensional coordinate system may be established in the work space 16 and the position vector of the sound source 12 may be given by P'=(x,y,z,θ,ϕ), where ϕ represents an elevation angle of the sound source signal given off by the sound source 12, the elevation angle being expressed in relation to an xy plane.

Next, the sound source characteristic determining device 10 will be described in detail with reference to FIG. 2.

The sound source characteristic determining device 10 can be implemented, for example, by executing software containing features of the present invention on a computer, workstation, or the like equipped with an input/output device, CPU, memory, external storage device, or the like, but part of the sound source characteristic determining device 10 can be implemented by hardware. FIG. 2 shows this configuration as functional blocks.

Figure 2:
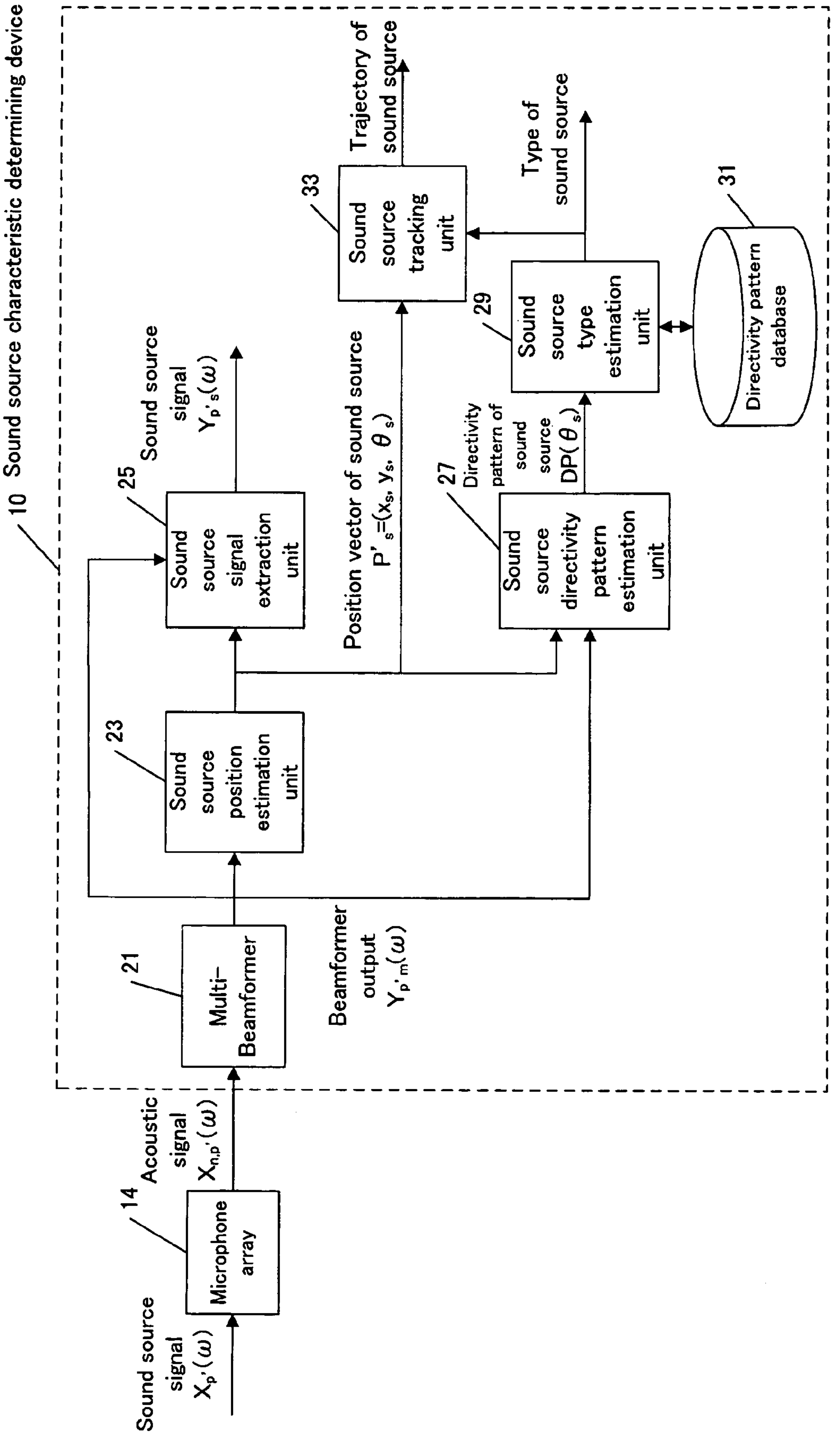
FIG. 2 is a block diagram of the sound source characteristic determining device.

FIG. 2 is a block diagram of the sound source characteristic determining device 10 according to this embodiment. The blocks of the sound source characteristic determining device 10 will be described separately below.

Multi-Beamformer

Figure 3:
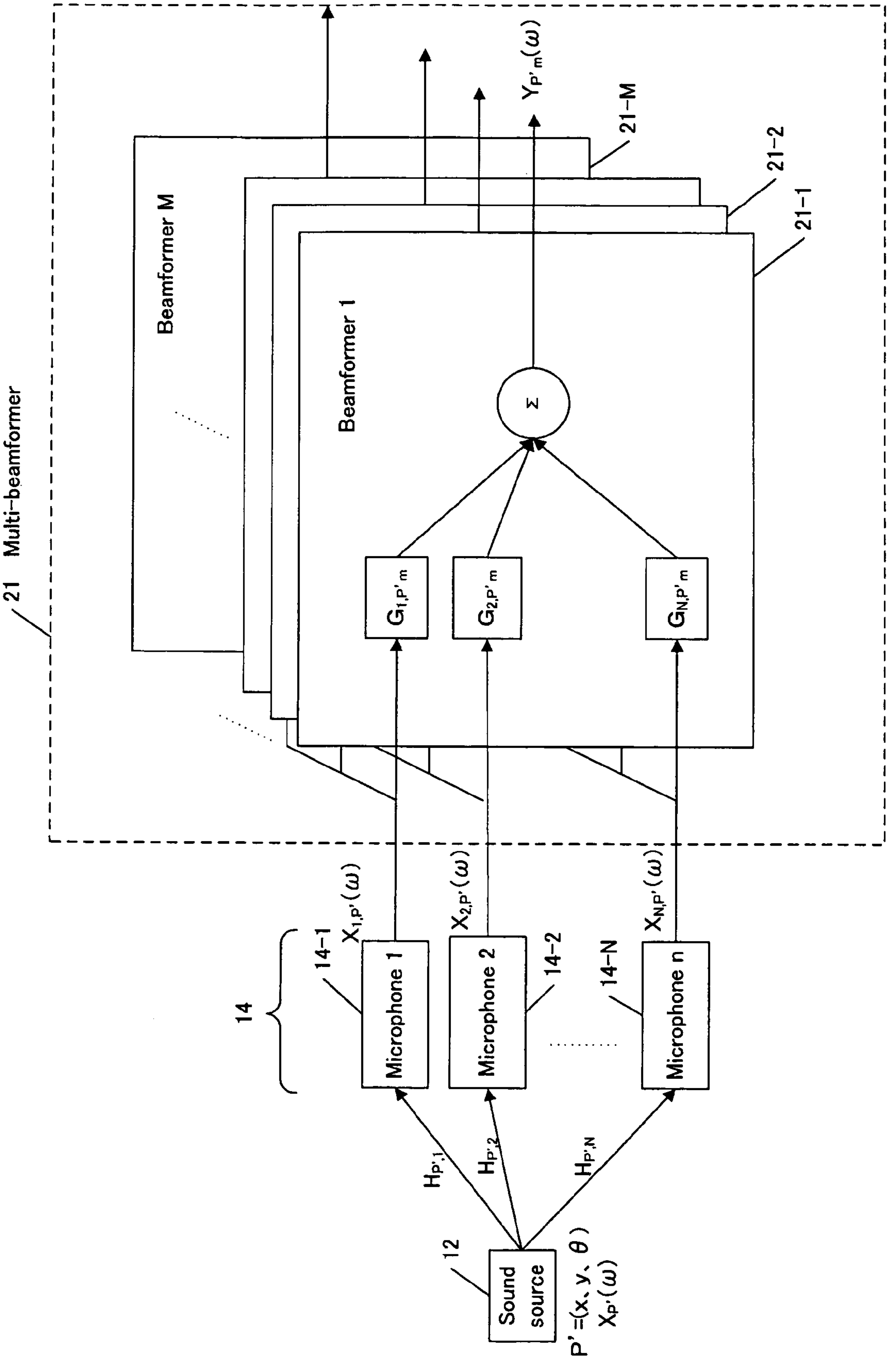
FIG. 3 is a configuration diagram of a multi-beamformer.

A multi-beamformer 21 multiplies signals $X_{n,P'}(\omega)$ (n=1, . . . , N) detected by the microphones 14-1 to 14-N in the microphone array 14 by filter functions and outputs a plurality of beamformer output signals $Y_{P'm}(\omega)$ (m=1, . . . , M). The multi-beamformer 21 includes M beamformers 21-1 to 21-M as shown in FIG. 3.

Here, m is a positional index which breaks up the work space 16 into P+Q+R segments as follows: $x_1, \ldots, x_p, \ldots, x_P$; $y_1, \ldots, y_q, \ldots, y_Q$; $\theta_1, \ldots, \theta_r, \ldots, \theta_R$. The positional index is given by m=(p+qP)R+r. The total number of positional indices m is P×Q×R.

The signals $X_{1,P'}(\omega)$ to $X_{N,P'}(\omega)$ detected by the respective microphones 14-1 to 14-N in the microphone array 14 are inputted in each of the beamformers 21-1 to 21-M.

The signals $X_{1,P'}(\omega)$ to $X_{N,P'}(\omega)$ are multiplied by filter functions $G_{1,P'm}$ to $G_{N,P'm}$ in the m-th (m=1, . . . , M) beamformer and the sum of the products is calculated as an output signal $Y_{P'm}(\omega)$ of the beamformer, where the filter functions are established separately for each beamformer.

The filter functions $G_{1,P'm}$ to $G_{N,P'm}$ are set such that when it is assumed that the sound source 12 is located at a position defined by a unique position vector P'm=(xp,yq,θr) in the work space 16, the sound source signal $X_{P'}(\omega)$ will be extracted from the signals $X_{1,P'}(\omega)$ to $X_{N,P'}(\omega)$ detected by the microphone array 14.

Next, description will be given of how to derive filter functions G of the beamformers 21-1 to 21-M in the multi-beamformer 21. Derivation of the filter functions $G_{1,P'm}$ to $G_{N,P'm}$ of the m-th (m=1, . . . , M) beamformer will be taken as an example.

The beamformer output $Y_{P'm}(\omega)$ which corresponds to the position vector P'm is given by Equation (1) using filter functions $G_{n,P'm}$ (n=1, . . . , N).

$$Y_{P'm}(\omega)=\sum_{n=1}^{N} G_{n,P'm}(\omega)X_{n,P'}(\omega) \tag{1}$$

In Equation (1), $X_{n,P'}(\omega)$ represents the acoustic signals detected by the microphones 14-1 to 14-N when the sound source 12 gives off a sound source signal $X_{P'}(\omega)$ at a position defined by the position vector P'. $X_{n,P'}(\omega)$ is given by Equation (2).

$$X_{n,P'}(\omega)=H_{P',n}(\omega)X_{p'}(\omega) \tag{2}$$

In Equation (2), $H_{P',n}(\omega)$ is a transfer function which represents transfer characteristics with respect to the n-th microphone from the position P'. According to this embodiment, the transfer function $H_{P',n}(\omega)$ is defined as follows by adding directivity to a model of how sounds are transmitted from the sound source 12 at the position P' to the microphones 14-1 to 14-N.

$$H_{P',n}(\omega)=A(\theta)\frac{v}{r\omega}e^{\frac{ir\omega}{v}} \tag{3}$$

where v represents sonic velocity and r represents distance from the position P' to the n-th microphone. The distance is given by r=((xn·x)^2+(yn−y)^2)^0.5, where xn and yn are x and y coordinates of the n-th microphone.

Equation (3) models the way in which sounds are transmitted from the sound source 12 to the microphones assuming that the sound source 12 is a point sound source in free space and then adds a cardioid-directivity pattern A(θ) to the model. The way in which sounds are transmitted includes differences in the signals among the microphones, such as phase differences and sound pressure differences, caused by differences in position among the microphones. The cardioid-directivity pattern A(θ) is a function established in advance to give directivity to the beamformers. The cardioid-directivity pattern A(O) will be described in detail later with reference to Equation (8).

Directional gain D is defined by Equation (4).

$$D(P'_m, P'_s)=\frac{Y_{P'm}(\omega)}{X_{P's}(\omega)}=\sum_{n=1}^{N} G_{n,P'm}(\omega)H_{P's,n}(\omega) \tag{4}$$

where P's is the position of the sound source

Equation (4) can be defined as matrix operations given by Equation (5).

$$D=HG$$

$$D=[d_1, \ldots, d_m, \ldots, d_M]^T$$

$$d_m=[D_{m,1}, \ldots, D_{m,k}, \ldots, D_{m,M}]$$

$$G=[g_1, \ldots, g_m, \ldots, g_M]$$

$$g_m=[G_{1,m}, \ldots, D_{n,m}, \ldots, D_{N,m}]^T$$

$$H=[H_{m,1}, \ldots, H_{m,k}, \ldots, H_{m,m}]^T$$

$$h_m=[H_{m,1}, \ldots, H_{m,k}, \ldots, H_{m,N}] \tag{5}$$

where D, H, and G are a directional gain matrix, transfer function matrix, and filter function matrix, respectively.

The filter function matrix G in Equation (5) can be found from Equation (6).

$$\hat{g}_m=[h_m]^+d_m=\frac{h_m^H}{|h_m|^2}d_m \tag{6}$$

where a gm hat (the symbol ^ above gm in Equation (6)) is an approximation of a component (column vector) which corresponds to the position m in the filter function matrix G, $h_m^H$ is the Hermitian transpose of hm, and $[h_m]^+$ is a pseudo-inverse of hm.

The directional gain matrix D in Equation (6) is defined by Equation (7) to estimate a directivity pattern of a sound source S. θa represents a peak direction of a directivity pattern in the directional gain matrix D.

$$D_{m,k}=\begin{cases}1 & \text{if } \theta_r=\theta_a\\ 0 & \text{otherwise}\end{cases} \tag{7}$$

The transfer function matrix H is determined by defining a cardioid-directivity pattern A(θr) using Equation (8), where Δθ represents resolution of orientation estimation (180/R degrees). For example, when estimating orientation of the sound source using eight directions (R=8), the resolution is 22.5 degrees.

$$A(\theta_r)=\begin{cases}1 & \text{if } |\theta_r-\theta_a|<\Delta\theta\\ 0 & \text{otherwise}\end{cases} \tag{8}$$

In addition to a rectangular wave given by Equation (8), the cardioid-directivity pattern A(θr) can be given by any function (e.g., triangular pulses) as long as the function represents power distributed centering around a particular direction.

The filter function matrix G, which is derived from the transfer function matrix H and directional gain matrix D, includes the cardioid-directivity pattern used to estimate the orientation of the sound source as well as transfer characteristics of the space. Thus, the filter function matrix G can be modeled using phase differences and sound pressure differences caused by positional relationship with the sound source which varies from microphone to microphone, differences in transfer characteristics and the like, and the orientation of the sound source, as functions.

The filter function matrix G is recalculated when measuring conditions of the sound are changed, such as when the installation position of the microphone array 14 is changed or layout of objects in the work space is changed.

Incidentally, although in this embodiment, the model given by Equation (3) is used as the transfer function matrix H, alternatively impulse responses to all position vectors P' in the work space may be measured and a transfer function may be derived based on the impulse responses. Even in that case, the impulse responses are measured in each direction θ at any given position (x,y) in the space, and thus the directivity pattern of the speaker which outputs the impulses is unidirectional.

The multi-beamformer 21 transmits the outputs $Y_{P'm}(c)$ of the beamformers 21-1 to 21-M to a sound source position estimation unit 23, sound source signal extraction unit 25, and sound source directivity pattern estimation unit 27.

Sound Source Position Estimation Unit

The sound source position estimation unit 23 estimates the position vector P's (xs,ys,θs) of the sound source 12 based on the outputs $Y_{P'm}(\omega)$ (m=1, . . . , M) from the multi-beamformer 21. The sound source position estimation unit 23 selects the beamformer which provides the maximum value of the outputs $Y_{P'm}(\omega)$ calculated by the beamformers 21-1 to 21-M. Then, the sound source position estimation unit 23 estimates the position vector P'm of the sound source 12 which corresponds to the selected beamformer to be the position vector P's (xs,ys, θs) of the sound source.

Alternatively, the sound source position estimation unit 23 may estimate the position of the sound source through steps 1 to 8 below to reduce effects of noise.

1. Find a power spectrum N(ω) of background noise detected by each microphone, select subbands larger than a predetermined threshold (e.g., 20 [dB]) out of the signals $X_{n,p'}(\omega)$ detected by the microphones, and denote the subbands by ω7, . . . , ωl, . . . , ωL.

2. Define reliability SCR(ωl) of each subband using Equations (9) and (10).

$$SCR(\omega_1) = \frac{X(\omega_l) - N(\omega_l)}{X(\omega_l)} \tag{9}$$

$$X(\omega_l) = \frac{1}{N}\sum_{n=1}^{N} |X_n(\omega_l)|^2 \tag{10}$$

3. Find the beamformer outputs $Y_{P'm}(\omega l)$ located at positions defined by Pm' using Equation (1). $Y_{P'm}(\omega l)$ is calculated for every P'm (m=1, . . . , M).

4. Find spectral intensity I(P'm) in each direction using Equation (11).

$$I(P'_m) = \sum_{l=1}^{L} SCR(\omega_l)|Y_{P'm}(\omega_l)|^2 \tag{11}$$

5. Find spectral intensity I(xp,yq) with a direction component added at position (xp,yq) using Equation (12).

$$I(x_p, y_q) = \sum_{r=1}^{R} I(P'_m) = \sum_{r=1}^{R} I(x_p, y_q, \theta_r) \tag{12}$$

6. Find the position vector Ps=(xs,ys) of the sound source using Equation (13).

$$(x_s, y_s) = \underset{p,q}{\operatorname{argmax}} I(x_p, y_q) \tag{13}$$

7. Find the directivity pattern DP(θr) of the sound source S using Equation (14).

$$DP(\theta_r) = \left\{ \frac{I(x_s, y_s, \theta_r)}{I(x_s, y_s)} \,\middle|\, r = 1, \ldots , R \right\} \tag{14}$$

8. Find orientation θs of the sound source using Equation (15).

$$\theta_s = \underset{r}{\operatorname{argmax}} DP(\theta_r) \tag{15}$$

The sound source position estimation unit 23 transmits the derived position and direction of the sound source 12 to the sound source signal extraction unit 25, the sound source directivity pattern estimation unit 27, and a sound source tracking unit 33.

Sound Source Signal Extraction Unit

The sound source signal extraction unit 25 extracts a sound source signal $Y_{P's}(\omega)$ given off by the sound source located at a position defined by the position vector P's.

Based on the position vector P's of the sound source 12 derived by the sound source position estimation unit 23, the sound source signal extraction unit 25 finds output of that beamformer of the multi-beamformer 21 which corresponds to P's based on the position vector P's of the sound source 12 derived by the sound source position estimation unit 23 and extracts the output as the sound source signal $Y_{P's}(\omega)$.

Alternatively, by fixing the position vector P=(xs,ys) of the sound source 12 estimated by the sound source position estimation unit 23, the sound source signal extraction unit 25 may find outputs of the beamformers corresponding to position vectors (xs,ys,$\theta_1$) to (xs,ys,$\theta_R$) and extract the sum of the outputs as the sound source signal $Y_{P's}(\omega)$.

Sound Source Directivity Pattern Estimation Unit

The sound source directivity pattern estimation unit 27 estimates the directivity pattern DP(θr) (r=1, . . . , R) of the sound source. The sound source directivity pattern estimation unit 27 finds the beamformer outputs $Y_{P'm}(\omega)$ by fixing the position coordinates (xs,ys) in the position vectors P's=(xs, ys,θs) of the sound source 12 derived by the sound source position estimation unit 23 and varying the direction θ from $\theta_1$ to $\theta_R$. The sound source directivity pattern estimation unit 27 finds outputs of the beamformers corresponding to position vectors (xs,ys,$\theta_1$) to (xs,ys,$\theta_R$) and designates a set of the outputs as the directivity pattern DP($\theta_r$) of the sound source, where R is a parameter which determines the resolution of the direction θ.

Figure 4:
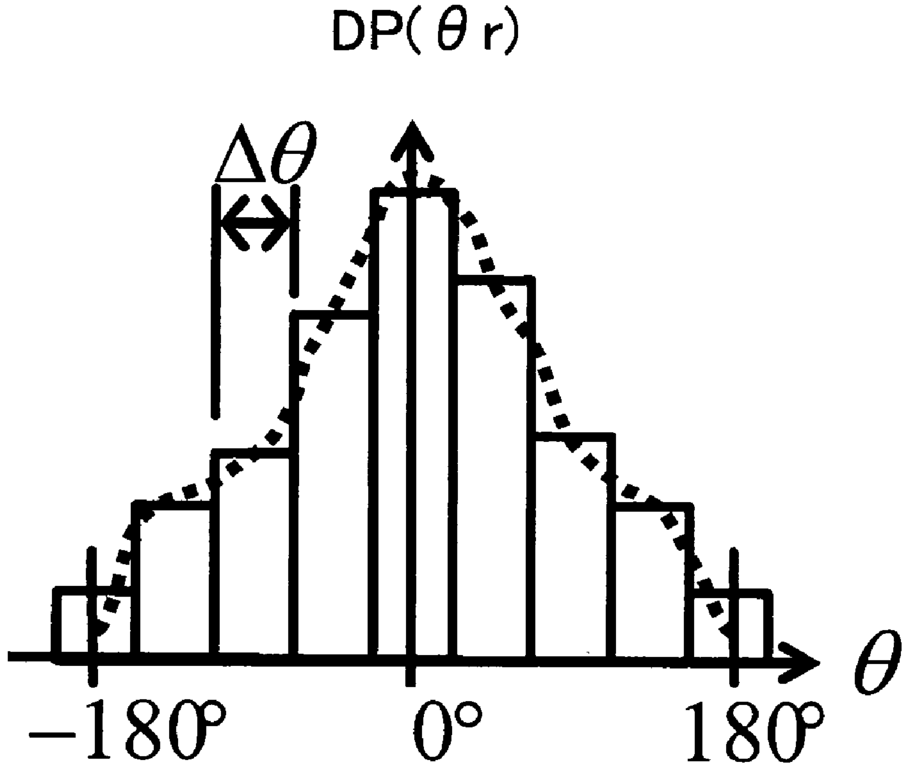
FIG. 4 is a diagram showing an example of a directivity pattern DP(θr) when θs=0.

FIG. 4 is a diagram showing an example of the directivity pattern DP(θr) when θs=0. As shown in FIG. 4, generally a directivity pattern takes a maximum value in the direction θs of the sound source, takes increasingly smaller values with increasing distance from θs, and becomes minimum in the direction opposite to θs (+180 degrees in FIG. 4).

Incidentally, if the sound source position estimation unit 23 estimates the position of the sound source using Equations (9) to (15) alternatively, the sound source directivity pattern estimation unit 27 may find the directivity pattern DP(θr) using calculation results of Equation (14).

The sound source directivity pattern estimation unit 27 transmits the directivity pattern DP(θr) of the sound source to a sound source type estimation unit 29.

Sound Source Type Estimation Unit

The sound source type estimation unit 29 estimates the type of the sound source 12 based on the directivity pattern DP(θr) obtained by the sound source directivity pattern estimation unit 27. The directivity pattern DP(θr) generally has a shape such as shown in FIG. 4, but since a peak value and other features vary depending on human utterances or machine voices, graph shape varies with the type of sound source. Directivity pattern data corresponding to various sound source types is recorded in a directivity pattern database 31. The sound source type estimation unit 29 selects data closest to the directivity pattern DP(θr) of the sound source 12 by referring to the directivity pattern database 31 and adopts the type of the selected data as the estimated type of the sound source 12.

The sound source type estimation unit 29 transmits the estimated type of the sound source 12 to the sound source tracking unit 33.

Sound Source Tracking Unit

The sound source tracking unit 33 tracks the sound source if the sound source 12 is moving in the work space. The sound source tracking unit 33 compares the position vector Ps' of the sound source 12 with the position vector of the sound source 12 estimated one step earlier. If a difference between the vectors falls within a predetermined range and if the sound source types estimated by the sound source type estimation unit 29 are identical, the position vectors are stored by being classified into the same group. This provides a trajectory of the sound source 12, making it possible to keep track of the sound source 12.

The functional blocks of the sound source characteristic determining device 10 have been described above with reference to FIG. 2.

A technique for estimating characteristics of a single sound source 12 has been described in this embodiment. Alternatively, positions of multiple sound sources can be estimated by designating the sound source estimated by the sound source position estimation unit 23 as a first sound source, finding a residual signal by subtracting a signal of the first sound source from an original signal, and repeating a sound source position estimation process.

The process is repeated predetermined times or as many times as there are sound sources.

Specifically, first an acoustic signal Xsn(ω) originating from the first sound source detected by the microphones 14-1 to 14-N in the microphone array 14 is estimated using Equation (16).

$$X_{sn}(\omega) = \sum_{r=1}^{R} H_{(xs,ys,\theta r),n} \cdot Y_{(xs,ys,\theta r)}(\omega) \tag{16}$$

where $H_{(xs,ys,\ \theta r),n}$ is a transfer function which represents transfer characteristics with respect to the n-th microphone from the position (xs,ys,θ1), . . . , (xs,ys,θR) while $Y_{(xs,ys,\theta r)}(\omega)$ represents beamformer outputs $Y_{(xs,ys,\ \theta 1)}(\omega)$, . . . , $Y_{(xs,ys,\theta R)}(\omega)$ corresponding to the position (xs,ys) of the first sound source.

Next, using Equation (17), residual signals X'n(ω) are found by subtracting the acoustic signal Xsn(ω) from the acoustic signals Xn,p'(ω) detected by the microphones 14-1 to 14-N in the microphone array. Then, using Equation (18), beamformer outputs $Y'_{P'm}(\omega)$ corresponding to the residual signals are found by substituting the residual signals X'n(ω) for Xn,p'(ω) in Equation (1).

$$X_n'(\omega) = X_{n,p'}(\omega) - X_{sn}(\omega) \tag{17}$$

$$Y'_{p'm}(\omega) = \sum_{n=1}^{N} G_{n,p'm}(\omega) X_n'(\omega) \tag{18}$$

Out of $Y'_{P'm}(\omega)$ thus determined, the position vector P'm of the beamformer which takes a maximum value is estimated to be the position of a second sound source.

It is alternatively possible to find Xsn(ωl) by substituting ω in Equation (16) with ωl found in Step 1 of the sound source position estimation unit 23, find the residual signals X'n(ωl) by calculating Equation (17) using the calculated Xsn(ωl), find the beamformer outputs $Y'_{P'm}(\omega l)$ by calculating Equation (18) using the calculated X'n(ωl), substitute $Y'_{P'm}(\omega \mathbf{1})$ for $Y'_{P'm}(\omega l)$ in Step 3 of the sound source position estimation unit 23, and thereby estimate the sound source position.

Although in this embodiment, a spectrum is found from acoustic signals, time waveform signals resulting from conversion of the spectrum may be used alternatively.

The use of the present invention allows, for example, a service robot which guides a human being around a room to distinguish the human being from a television set or another robot, estimate sound source position and orientation of the human being, and move in front so as to face the human being squarely.

Also, since the position and orientation of the human being is known, the service robot can guide the human being based on a viewing point of the human being.

Next, description will be given of a sound source position estimation experiment, sound source type estimation experiment, and sound source tracking experiment by means of the sound source characteristic determining device 10 according to the present invention.

Figure 5:
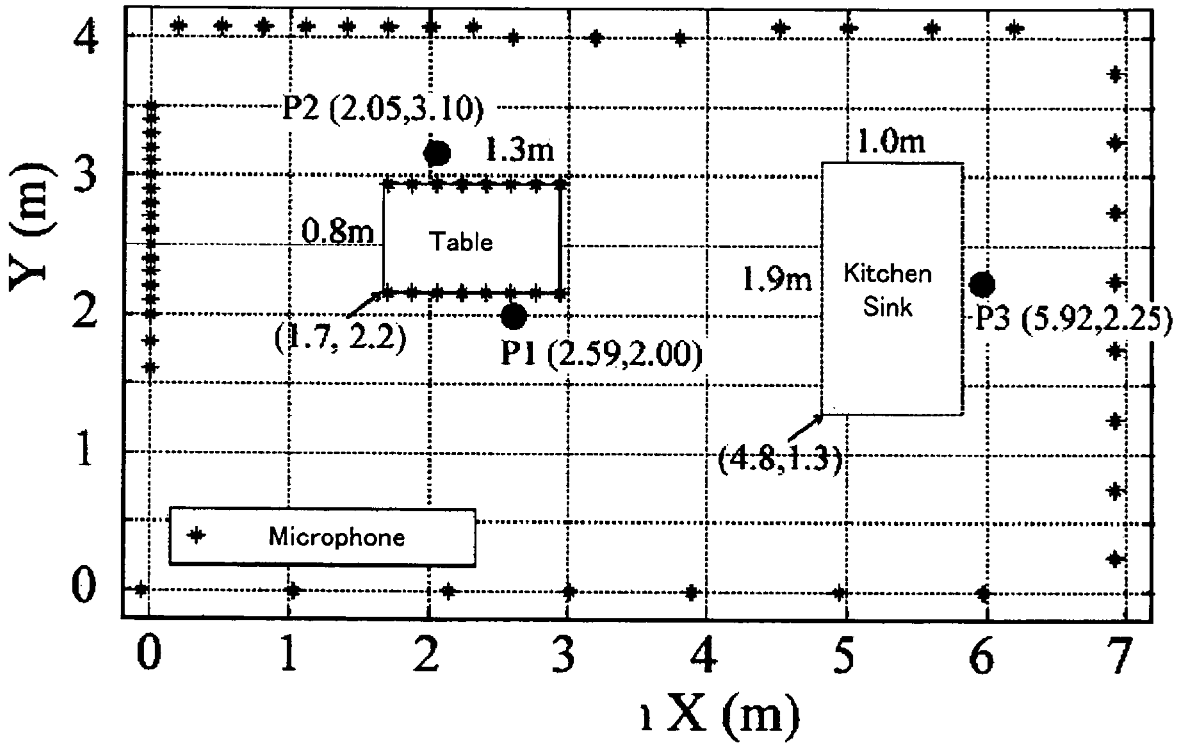
FIG. 5 is a diagram showing an experimental environment.

The experiments were conducted in an environment shown in FIG. 5. Work space measured 7 meters in an x direction and 4 meters in a y direction. In the work space, there were a table and a kitchen sink and a 64-channel microphone array was installed on wall surfaces and the table. The resolution of position vectors was 0.25 meters. Sound sources were placed at coordinates P1 (2.59, 2.00), P2 (2.05, 3.10), and P3 (5.92, 2.25) in the work space.

In the sound source position estimation experiment, sound source positions were estimated at the coordinates P1 and P2 in the work space using recorded voice played back through a loudspeaker and voice uttered by a human being, as sound sources. In this experiment, the average of 150 trials was taken using Equation (3) as the transfer function H. Estimation errors in the sound source position (xs,ys) were 0.15 m at P1 and 0.40 m at P2 in the case of the recorded voice from the loudspeaker, and 0.04 m at P1 and 0.36 m at P2 in the case of the human voice.

In the sound source type estimation experiment, the directivity pattern DP(θr) was estimated at the coordinates P1 using the recorded voice played back through a loudspeaker and voice uttered by a human being, as sound sources. In this experiment, a function derived through impulse responses was used as the transfer function H and the direction θs of the sound source was set at 180 degrees. The directivity pattern DP(θr) was derived using Equation (14).

Figure 6:
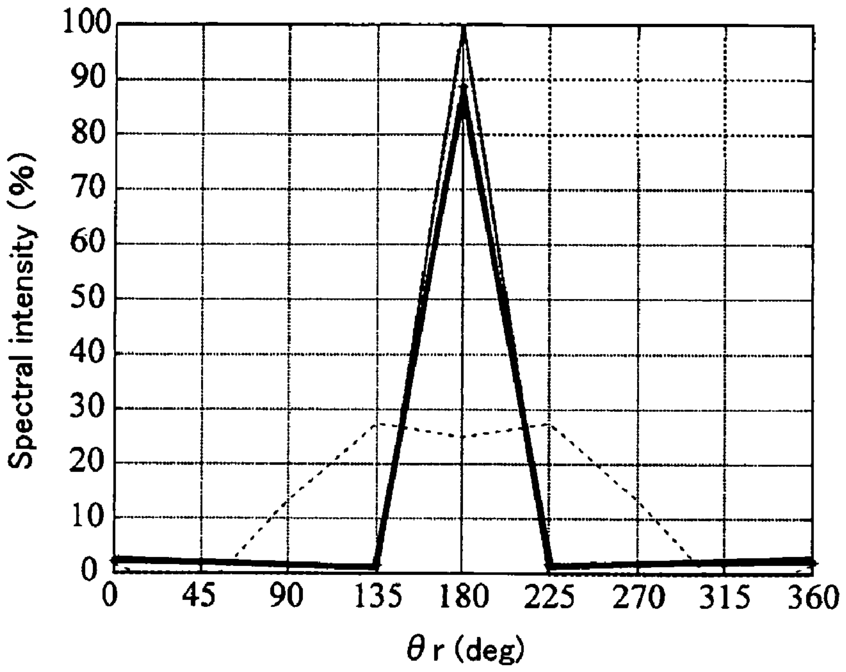
FIGS. 6(*a*) and 6(*b*) are diagrams showing directivity patterns DP(θr) estimated by the sound source characteristic determining device.
Figure 6:
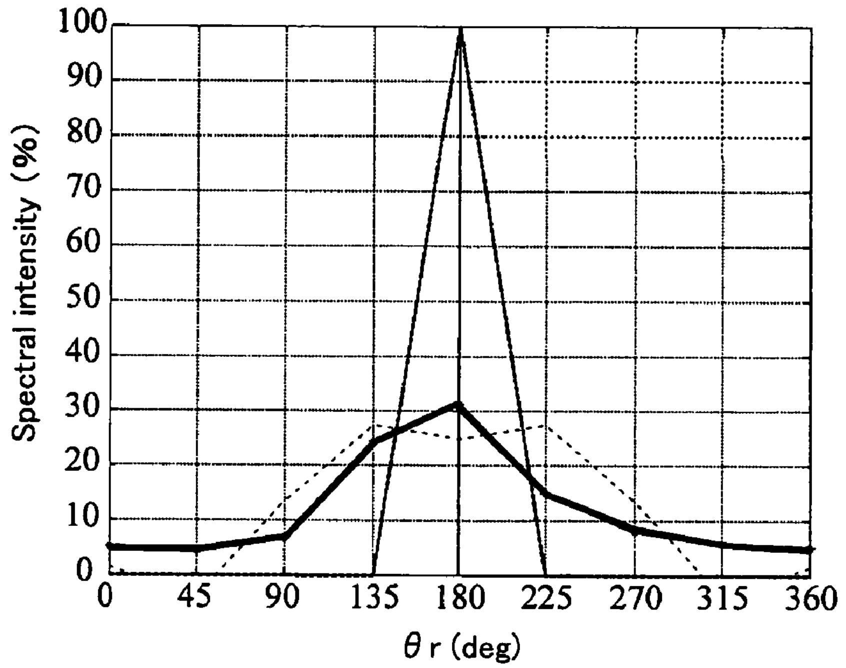

FIGS. 6(*a*) and 6(*b*) are diagrams showing estimated directivity patterns DP(θr), where the abscissa represents the direction θs and the ordinate represents the spectral intensity I(xs,ys,θr)/I(xs,ys). Thin lines in the graphs represent a directivity pattern of the recorded voice stored in a directivity pattern database and dotted lines represent a directivity pattern of the human voice stored in the directivity pattern database. A thick line in FIG. 6(*a*) represents an estimated directivity pattern of the sound source provided by the recorded voice from the loudspeaker while a thick line in FIG. 6(*b*) represents an estimated directivity pattern of the sound source provided by the human voice.

As shown in FIGS. 6(*a*) and 6(*b*), the sound source characteristic determining device 10 can estimate different directivity patterns according to the type of sound source.

In the sound source tracking experiment, the position of a sound source was tracked by moving the sound source from P1 to P2, and then to P3. In this experiment, the sound source was a white noise outputted from a loudspeaker. The position vector P' of the sound source was estimated at 20-millisecond intervals using Equation (3) as the transfer function H. The estimated position vector P' of the sound source was compared with the position and direction of the sound source measured with a three-dimensional ultrasonic tag system to find estimation errors at different time points, and then the estimation errors were averaged.

The three-dimensional ultrasonic tag system detects differences between the time of ultrasonic output from a tag and the time of input in a receiver, converts difference information into three-dimensional information using a technique similar to triangulation, and thereby implements a GPS function in a room. The system is capable of position detection to within a few centimeters.

As a result of the experiment, the tracking errors were 0.24 m in the sound source position (xs,ys) and 9.8 degrees in the orientation θ of the sound source.

Specific examples of the present invention have been described above, but the present invention is not limited to such specific examples.

The invention claimed is:

1. A sound source characteristic determining device, comprising:

a plurality of beamformers each of which, responsive to a plurality of microphones capturing a sound produced by a sound source at any given position in a predetermined space, weights signals detected by the respective microphones using a filter function and produces a sum of the weighted signals, each of the beamformers having a filter function of a cardioid-directivity pattern corresponding to an orientation at an assumed sound source position in the space, one beamformer being provided for each of different positions and different orientations in the space;

means, responsive to the microphones detecting the sound, for estimating a position and orientation of the sound source in the space based on the beamformer that produces a highest output value wherein the position and orientation corresponding to the beamformer that has produced the highest output value is estimated to be the position and orientation of the sound source; and means for summing outputs from a plurality of beamformers that correspond to the estimated position of the sound source and that have different cardioid-directivity, a summed value of the outputs from the plurality of beamformers being determined to be a sound signal from the sound source.

2. A sound source characteristic determining device, comprising:

a plurality of microphones for capturing a sound produced by a sound source at any given position in a predetermined space;

a plurality of beamformers associated with different positions and different orientations in the space, each beamformer including a plurality of filters associated with said plurality of microphones for performing a filter function of cardioid-directivity pattern corresponding to an orientation at an assumed sound source position in the space, said each beamformer producing a sum of the outputs of said plurality of filters as an output of said each beamformer, wherein each of said filters weights signals detected by a microphone associated with the filter;

means for determining the beamformer providing a highest output to select the position associated with said beamformer as the position of the sound source; and means for determining outputs of the beamformers at the selected position with various orientations and determining directivity of the sound source in terms of a set of outputs from the beamformers: and means for summing the outputs from a plurality of beamformers that correspond to the position of the sound source and that have different cardioid-directivity, a summed value of the outputs from the plurality of beamformers being determined to be a sound signal from the sound source.

3. The device according to claim 1, further comprising:

means for determining outputs of the beamformers at the selected position to estimate directivity of the sound source in terms of a set of outputs from the beamformers.

4. The device according to claim 3, further comprising:

means for comparing the estimated directivity with a database containing data on a plurality of directivity patterns according to types of sound source, wherein the type that is closest to the estimated directivity is determined to be the type of the sound source.

5. The device according to claim 4, further comprising:

sound source tracking means which compares the estimated position, orientation, and type of the sound source with a position, orientation and type of the sound source estimated one time step earlier and classifies the sound sources into a same group by regarding the sound sources as identical if deviations in the position and orientation fall within predetermined ranges and if the types are identical.

6. A sound source characteristic determining device, implemented in hardware at least in part, comprising:

a plurality of beamformers each of which, responsive to a plurality of microphones capturing a sound produced by a sound source at any given position in a predetermined space, weights signals detected by the respective microphones using a filter function and produces a sum of the weighted signals, each of the beamformers having a filter function of a cardioid-directivity pattern corresponding to an orientation at an assumed sound source position in the space, one beamformer being provided for each of different positions and different orientations in the space;

a sound source estimation unit, responsive to the microphones detecting the sound, configured to estimate a position and orientation of the sound source in the space based on the beamformer that produces a highest output value wherein the position and orientation corresponding to the beamformer that has produced the highest output value is estimated to be the position and orientation of the sound source; and a summation unit configured to sum outputs from a plurality of beamformers that correspond to the estimated position of the sound source and that have different cardioid-directivity, a summed value of the outputs from the plurality of beamformers being determined to be a sound signal from the sound source.

7. A sound source characteristic determining device, comprising:

a plurality of microphones configured to capture a sound produced by a sound source at any given position in a predetermined space;

a plurality of beamformers associated with different positions and different orientations in the space, each beamformer comprising a plurality of filters associated with said plurality of microphones to perform a filter function of cardioid-directivity pattern corresponding to an orientation at an assumed sound source position in the space, wherein said each beamformer producing a sum of the outputs of said plurality of filters as an output of said each beamformer, wherein each of said filters weights signals detected by a microphone associated with the filter;

a determining device configured to determine the beamformer providing a highest output to select the position associated with said beamformer as the position of the sound source;

a sound source determining device configured to determine outputs of the beamformers at the selected position with various orientations and configured to determine directivity of the sound source in terms of a set of outputs from the beamformers; and a summation unit configured to sum the outputs from a plurality of beamformers that correspond to the position of the sound source and that have different cardioid-directivity, a summed value of the outputs from the plurality of beamformers being determined to be a sound signal from the sound source.

8. The device according to claim 6, further comprising:

a sound source determining device configured to determine outputs of the beamformers at the selected position to estimate directivity of the sound source in terms of a set of outputs from the beamformers.

9. The device according to claim 8, further comprising:

a source type estimation unit configured to compare the estimated directivity with a database containing data on a plurality of directivity patterns according to types of sound source, wherein the type that is closest to the estimated directivity is determined to be the type of the sound source.

10. The device according to claim 9, further comprising:

a sound source tracking unit configured to compare the estimated position, orientation, and type of the sound source with a position, orientation and type of the sound source estimated one time step earlier and classifies the sound sources into a same group by regarding the sound sources as identical if deviations in the position and orientation fall within predetermined ranges and if the types are identical.

* * * * *